Oct. 6, 1953  C. BECK  2,654,348
LOAD COMPENSATED TRANSFER VALVE
Filed Sept. 19, 1952
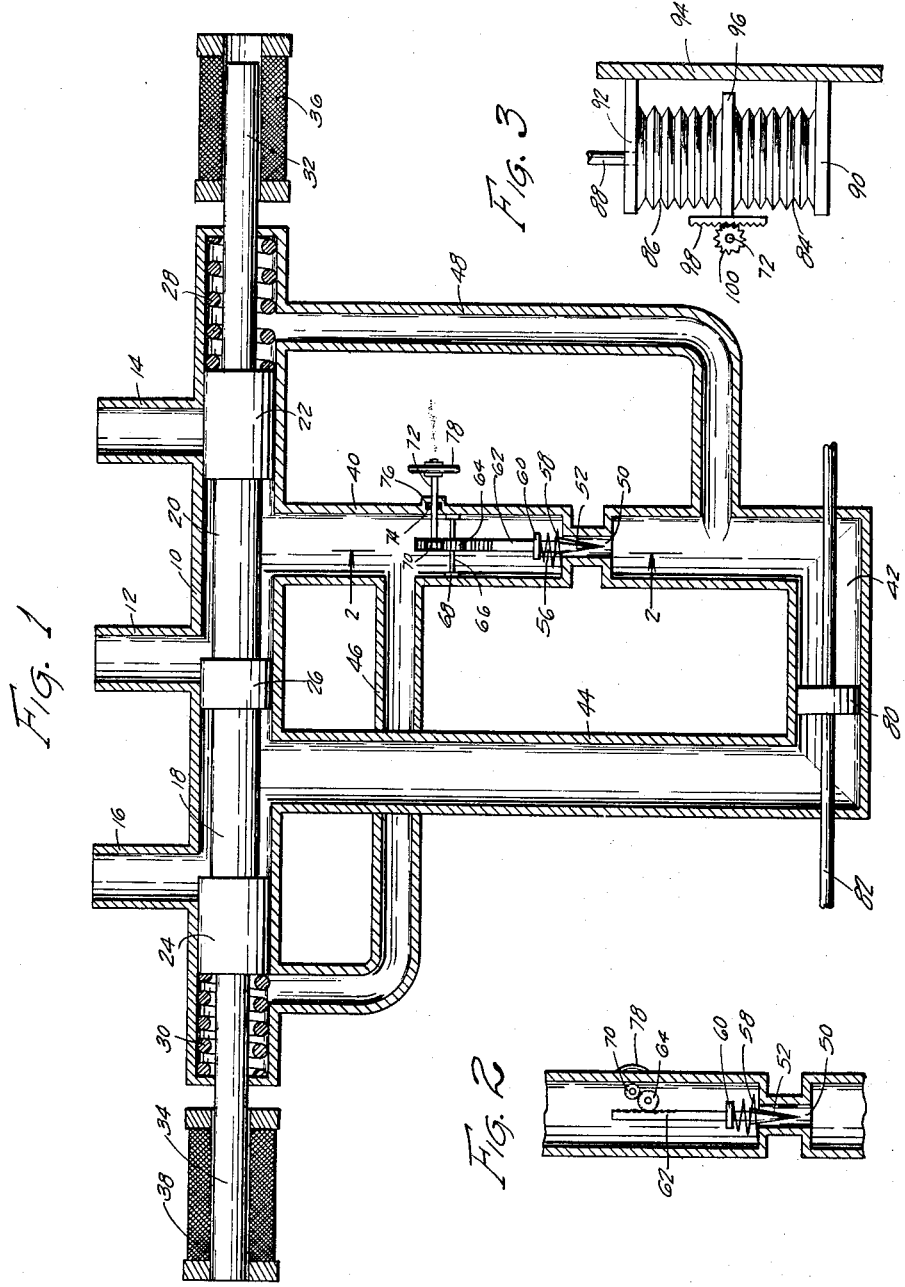
INVENTOR.
CYRUS BECK
BY
ATTORNEY

UNITED STATES PATENT OFFICE 2,654,348

LOAD COMPENSATED TRANSFER VALVE

Cyrus Beck, Philadelphia, Pa.

Application September 19, 1952, Serial No. 310,570

12 Claims. (Cl. 121—41)

(Granted under Title 35, U. S. Code (1952), sec. 266)

The invention described herein may be manufactured and used by or for the Government of the United States of America for governmental purposes without the payment of any royalties thereon or therefor.

This invention relates to balanced transfer valves, and it particularly relates to balanced valves of the solenoid type wherein the valve is adapted to be returned to its neutral position by fluid-pressure means.

Heretofore, in the case of a balanced type valve, it has been necessary to provide a specific type of return spring having a predetermined spring constant to afford a predetermined natural frequency of the valve. In order to provide a spring having the desired natural frequency for each change in conditions, it was necessary to change the mass, damping or spring rate of the metallic restoring spring. To do this, it was necessary to disassemble the valve mechanism and substitute the required type of spring for each change in the natural frequency of the controlled system. This was generally troublesome and time-consuming, and required the maintenance of a complete range of spring types.

This invention provides a means to use the fluid pressure in a system to aid the metallic restoring spring to bring the valve back to a condition of equilibrium quickly in order to eliminate a large proportion of the resonance of the valve body while it is being restored to its neutral position. Even more important, this invention provides a means to automatically vary the natural frequency of the valve so as to correspond to the natural frequency of the system which it controls. This is of particular importance where the controlled system is a servo-mechanism for actuating the elevators, rudder, etc. of a guided missile or the like. Furthermore, when this balanced valve is used on a guided missile or the like to control a servo-mechanism, as the missile flys through the air, the pressure at the accumulator or fluid storage tank decreases since work is constantly being done by the servo and, therefore, energy is being lost by the system. This decrease in pressure, in ordinary transfer valves used heretofore, results in more sluggish operation of the servo-mechanism. However, in this invention, the decrease in pressure is compensated for by a retardation of the closing movement of the valve which allows a greater fluid flow through the opening and a buildup of pressure in the system. In addition to the above advantages, if there is a counter-acting force against the servo-mechanism, as is always the case in guided missiles where the wind resistance is a factor, this creates a back pressure in the fluid-pressure system. This back pressure is present at the valve chamber side of the inlet opening leading from the accumulator and, thereby, reduces the pressure differential across this inlet opening. This causes a reduction of flow rate through this inlet opening. The decreased flow rate would ordinarily tend to reduce the pressure in the fluid system and cause sluggish operation of the servo-mechanism. However, in this invention, there is an automatic compensation which acts to retard closing of the valve. As in the case above, this causes an increase in the fluid flow and a consequent buildup of the pressure in the system.

It is, therefore, one object of this invention to provide a simple method of changing the natural frequency of a balanced transfer valve without altering the mass, damping coefficient, or spring constant of the metallic restoring spring.

Another object of this invention is to provide a means for automatically varying the natural frequency of a balanced transfer valve to correspond with the natural frequency of a system to be controlled by the valve.

Another object of this invention is to provide a method of making the natural frequency of a balanced transfer valve a function of the dynamic state of a fluid-pressure system.

Another object of this invention is to provide an automatic means to compensate for the loss of pressure in a fluid-pressure system due to dissipation of energy from the system.

Another object of this invention is to provide an automatic means to compensate for loss of pressure in a fluid-pressure system due to a load on the system causing a back-pressure.

Another object of this invention is to prevent undue resonance of a balanced transfer valve.

Another object of this invention is to provide a method of changing the natural frequency of a balanced transfer valve without the necessity of dismantling the valve mechanism.

Another object of this invention is to provide a means for automatically and efficiently restoring a balanced transfer valve to its neutral position.

Other objects and many of the attendant advantages of this invention will be readily appreciated as the same becomes better understood by reference to the following detailed description when considered in connection with the accompanying drawings wherein:

Fig. 1 is a cross-sectional view of the transfer valve and its fluid balancing system.

Fig. 2 is an enlarged sectional view of the adjustable orifice and its adjusting means taken on line 2—2 of Fig. 1.

Fig. 3 is a side elevation of a device for automatically controlling the adjustable valve in accordance with a change in pressure.

Referring now in greater detail to the drawing wherein similar reference characters refer to similar parts, there is shown an elongated valve chamber 10 having an inlet 12 and outlets 14 and 16 on either side of inlet 12. A valve member 18 is slidably positioned within the chamber 10. This valve member comprises an elongated stem 20 having three cylindrical heads, spaced from each other, thereon. The head 22 lies adjacent one end of the stem while the head 24 lies adjacent the opposite end of the stem. Intermediate these two heads is a smaller head 26. The heads 22 and 24 are adapted to open or close the outlets 14 and 16, these outlets being connected to a sump, not shown. The head 26 is adapted to open or close the inlet 12 which leads from a source of fluid pressure such as an accumulator which is not here shown. All three valve heads are moved into their opening or closing positions upon longitudinal movement of the valve stem in one direction or the other.

At either end of the valve chamber 10 behind each of the heads 22 and 24 is positioned a spiral spring as at 28 and 30. Each of these springs surrounds an end of the valve stem and is positioned between its respective valve head and the end wall of the chamber. An opening is provided in each end wall of the chamber and through each of these openings there extends one end of the valve stem. One of these valve stem ends is provided with a solenoid plunger 32 and the other of the ends is provided with a solenoid plunger 34. Surrounding each of these plungers is a solenoid coil as at 36 and 38, each of the coils being connected to a source of electrical energy, not shown.

A conduit 40 leads from the valve chamber, intermediate the inlet 12 and outlet 14, to one end of a chamber 42. Another conduit 44 leads from the opposite end of chamber 42 to the valve chamber at a position intermediate the inlet 12 and the outlet 16. A conduit 46 leads from the conduit 40 to that part of the chamber 10 which lies behind head 24 and another conduit 48 leads from the conduit 40 to that part of the valve chamber which lies behind head 22. The connection between conduits 40 and 46 is vertically spaced from the connection between conduits 40 and 48, the first connection being higher than the second as viewed in Fig. 1.

Positioned in the conduit 40, between the two fluid connections of conduits 46 and 48 to conduit 40, is a restricted orifice 50 adapted to be adjusted by a valve 52. The valve 52 may be of any design which is capable of varying the size of the orifice connecting the upper portion of conduit 40 to the lower portion. However, the preferred embodiment is illustrated as a needle valve as best shown in Fig. 2.

The needle valve 52 is reciprocable within the orifice 50 formed within the conduit 40. A stem 56 extends from the valve 52 and is surrounded by a spiral spring 58 which is positioned between the wall surrounding the upper end of the orifice 50 and a washer 60 formed on the stem 56. A rack 62 extends from the stem 56 and is adapted to be actuated by a pinion 64 mounted on a shaft 66 which is journaled in bearings 68 mounted in the inner wall of the conduit 40. A gear 70 is mounted on a shaft 72 which extends through a bearing 74 and through an opening in the conduit 40. A sealing ring 76 surrounds the shaft in the opening. A hand-wheel 78 is mounted on the shaft 72 outwardly of the conduit for the purpose of manually adjusting the position of the needle valve in the orifice.

In operation, when the valve 18 is in neutral position with spring 28 being exactly counterbalanced by spring 30, the heads 22 and 24 close the openings to outlet conduits 14 and 16 and the head 26 closes the inlet opening to conduit 12. If then, the solenoid 36 is actuated the plunger 32 will move to the left, as viewed in Fig. 1, moving the valve stem with it, against the opposing force of spring 30 to open inlet 12 and maintaining outlet 14 closed. This is the position of the valve as illustrated in Fig. 1. In this position, fluid enters the valve chamber from the accumulator through conduit 12 and flows through conduit 40. The fluid then takes two directions, one through branch conduit 46 to the chamber formed behind head 24 wherein the spring 30 is located, and the other through restricted orifice 50, the size of which has been adjusted by needle valve 52 operated manually through hand wheel 78. Since the orifice 50 provides a restriction, there is a pressure drop between its top and bottom ends so that the fluid that emerges from the orifice 50 is under less pressure than the fluid which entered it. The fluid which emerges from orifice 50 then takes two paths, one through the branch conduit 48 to the chamber formed behind head 22 wherein the spring 28 is located, and the other through conduit 40 and into the chamber 42 where it actuates a servo-piston 80 having a stem 82. The stem 82 extends outwardly of the chamber 42 and is connected to a body, not shown, which may be a rudder, elevator or any other device which is to be controlled. The fluid on the left side of the piston head 80, as viewed in Fig. 1, is forced by the pressure of the piston through the valve chamber 10 and through conduit 16 to a sump, not shown.

Meanwhile, the fluid flowing through conduit 46 to the chamber behind head 24 exerts a force which is added to the force of the return spring 30, this combined force tending to push the valve toward the right as viewed in Fig. 1. This force is opposed by a combined force of the spring 28 and the pressure of the fluid flowing from conduit 48 to the chamber behind head 22. However, since the springs 28 and 30 are of equal strength, and since the fluid pressure behind the head 24 is greater than the fluid pressure behind the head 22, the valve is pushed back until the conduits 12 and 16 are closed. At this time, since all fluid flow is halted, the springs 28 and 30 balance each other and the valve remains in its neutral position until the solenoid is again energized.

If the solenoid 38 is energized, the valve will be pushed to the right to open inlet 12 and outlet 14, keeping outlet 16 closed. In this case, the fluid pressure would also act to close the valve since the fluid pressure from conduit 12 would be applied through conduit 44, conduit 40 and conduit 48 to the chamber behind head 22 while there would be a pressure drop through orifice 50 which would provide a relatively lower fluid pressure in the chamber behind head 24. Since the fluid pressure in the chamber behind head 22 is, in this case, therefore, greater than the fluid pressure behind head 24, the valve would move to the left to close inlet opening 12 and outlet opening 14, thereby placing the valve back in balanced, neutral position.

It is apparent that if the left and right sides of the transfer valve are exactly alike, the metallic springs may be dispensed with entirely and the fluid pressure from either side would act to center the valve. This, however, would require a very fine adjustment.

If the valve is used in conjunction with a guided missile to activate a servo-mechanism for controlling the rudder, elevators, etc., as the missile flys through the air and the servo-mechanism is doing work, energy is dissipated by the system and the pressure in the accumulator is decreased, as explained above. This decrease in pressure causes a decrease in the flow rate through the inlet opening into the valve chamber. As a result, the pressure drop through the orifice 50 is decreased. This is due to the fact that although the pressure of the incoming fluid is relatively less, the size of the orifice remains the same and the pressure on its low pressure side remains the same. The differential between the two pressures is, thereby, decreased. The fluid pressure which is, therefore, added behind the head 22 is consequently, proportionally greater in comparison to the fluid pressure behind head 24. The result is that the inlet opening is made larger and more fluid is allowed to come through. This increase of fluid flow makes up for the loss of pressure so that the servo-piston is prevented from becoming sluggish in its operation.

It was also explained above that if there is a counter-acting force on the servo-piston due to a load such as caused by wind resistance, this counter-force creates a back pressure in the fluid system which is present at the outlet side of the valve inlet. This reduces the pressure difference between the valve chamber and the accumulator and causes a reduction of the rate of flow through the inlet. This reduction in flow rate causes a reduction in pressure which, in turn, acts to reduce the pressure drop across the orifice 50. There is, therefore, in this case, too, a relative buildup of the fluid pressure behind the head 22 which enlarges the inlet opening to allow more fluid to flow through.

It is apparent from the above, that this invention not only provides what is, in effect, a fluid spring for a balanced transfer valve, but also acts as its own servo-unit to automatically alter its dynamic characteristics when a change of environment takes place.

In addition, by adjusting the size of the restricted passage or orifice 50 it is possible to change the natural frequency of the balanced transfer valve system without altering the mass, damping or the spring rate of the metallic restoring springs employed in the system. Heretofore, to make such change in frequency it has been necessary to dismantle the valve assembly and substitute parts to gain this end. However, with this invention it is possible by a slight rotation of the control wheel 78 to adjust the needle valve 52 and provide a new spring rate and a new natural frequency. By varying the pressure drop across the orifice valve in this manner, the effective spring constant of the system may be varied.

The ability to change the natural frequency of the transfer valve mechanism may be advantageously employed to automatically correlate the mechanism with a changing condition or environment under which the mechanism operates or to automatically modify the valve mechanism and its action in accordance with the dynamic state of a fluid pressure system with which the valve mechanism is associated. Accordingly, an important feature of the invention is a provision for automatically controlling the size of the orifice 52 in accordance with an outside influence. For example, when the transfer valve mechanism is used in an aircraft or guided missile, the adjustment of its natural frequency may be made the function of air speed, angle of attack, rate of climb, mach number, altitude, et cetera.

As illustrative of such an automatic control, there is shown in Fig. 3 a device which is representative of a fluid pressure system separate from that of the transfer valve mechanism and which is responsive to a changing condition or environment. Specifically, the device of Fig. 3 is an aneroid type of barometer including two superimposed bellows 84 and 86. One of the bellows, such as 84, is sealed and contains air at sea level pressure. The other bellows 86 is open to the atmosphere and for this purpose a pipe 88 is provided which leads to the interior of the bellows. The two bellows are positioned between stationary members 90 and 92 which are mounted on a fixed support 94. The adjacent ends of the two bellows are connected to a movable common dividing wall 96 which carries a rack 98. The latter engages the teeth of a pinion 100 which may be fixed as shown in Fig. 3 to the control shaft 72 previously described. Changes in altitude will vary the differential pressure existing between the two bellows and cause the rack bar to rotate the pinion and alter the position of the needle valve 52 in the orifice 50.

It is thus apparent that the balanced transfer valve mechanism of Fig. 1 can be adjusted to change its operating characteristics or natural frequency without dismantling the mechanism and substituting parts and that this adjustment may be performed manually or automatically.

It is also evident that the valve mechanism of Fig. 1 may be operatively associated with another fluid pressure system such as represented in Fig. 3 and that its natural frequency may be automatically varied in response to changing conditions in the fluid pressure system. In this manner the natural frequency of the balanced transfer valve may become a function of the dynamic state of another system.

Obviously many modifications and variations of the present invention are possible in the light of the above teachings. It is, therefore, to be understood that within the scope of the appended claims the invention may be practiced otherwise than as specifically described.

What is claimed as the invention is:

1. In a fluid-pressure system, a valve chamber having fluid pressure inlet and outlet ports, a balanced type valve in said chamber, said valve being normally in a position to close said inlet and outlet ports, but being adapted to open said ports upon disturbance of the balancing forces controlling said valve, a first conduit extending from said valve chamber to one end of a servo-chamber for allowing fluid under pressure to flow from said valve chamber to said servo-chamber to actuate a servo mechanism, a second conduit extending from the opposite end of said servo-chamber back to said valve chamber, a pair of conduits each extending from said first conduit to a balancing chamber formed behind opposite ends of said valve, said pair of conduits having fluid connections with said first conduit which are spaced from each other longitudinally of said first conduit, and a restriction formed in said first conduit between the fluid connections of said pair of conduits with said first conduit, whereby fluid under pressure from said valve chamber is enabled to flow through one of said pair of conduits to one of said balancing chambers while fluid under a reduced pressure, due to its passage through said restriction, is enabled to flow through the other of said pair of conduits to the other of said balancing chambers.

2. The system of claim 1 wherein said restriction comprises an orifice the size of which is adapted to be adjusted by a valve mechanism.

3. The system of claim 2 wherein said valve mechanism is a needle valve which is adapted to be manually operated.

4. The system of claim 1 wherein the means for disturbing the balancing forces is a solenoid device.

5. The system of claim 1 wherein a spring is provided in either balancing chamber, said springs forming the balancing forces which normally hold the valve in a position to close said inlet and outlet ports.

6. The system of claim 1 wherein said inlet and outlet ports are adapted to be opened by a pair of means for disturbing the balancing forces, one of said pair of means being positioned at one end of said valve and the other of said pair of means being positioned at the opposite end of said valve, whereby said valve is adapted to be placed in port opening position by being moved in either of two opposite directions.

7. The system of claim 1 wherein said valve chamber comprises an elongated cylindrical tube having a fluid-pressure inlet opening positioned intermediate a pair of fluid-pressure outlet openings, said first conduit being connected to said valve chamber intermediate said inlet opening and one of said outlet openings and said second conduit being connected to said valve chamber intermediate said inlet opening and the other of said outlet openings, and wherein said valve is slidably positioned within said chamber, said valve comprising a stem which extends out from said elongated chamber at either end for being connected to an actuating means, and cylindrical heads formed on said stem at spaced intervals, the spacing of said heads corresponding to the spacing of said inlet and outlet openings, whereby, when said valve is in one position, said heads cover all three openings and when said valve is in another position, said heads uncover said inlet opening and one of said outlet openings.

8. The system of claim 1 wherein a valve is provided in the passage of said restriction which is capable of adjustment to vary the size of the passage, means sensitive to fluid pressure changes and movable proportionally thereto, and an operative connection between said last means and the valve in the passage of said restriction and rendering the latter automatically responsive to changes in fluid pressure sensed by the last means.

9. In a fluid pressure control system including a fluid pressure operated servomotor having a control piston responsive to fluid pressure acting on one side or the other side for moving the piston in opposite directions, a transfer control mechanism having a fluid pressure inlet and further having a pair of conduits arranged to deliver fluid under pressure to the opposite sides of the piston, a valve member in said transfer control mechanism having a limited movement in opposite directions along a prescribed path, said valve member being operable at a balanced intermediate position to cut off the flow of fluid from said inlet to both of said conduits, but operable when moved from said balanced position to cause delivery of fluid from said inlet to one or the other of said conduits depending on its direction of movement, means operatively associated with said valve member for moving the same in either direction, a pair of fluid pressure chambers arranged to act on said valve member in opposition to one another, each of said chambers having a fluid connection with one of said conduits in order to receive fluid under pressure therefrom, said fluid connections being spaced apart longitudinally of the fluid stream flowing in the conduit to which they are connected, and means in the section of said last mentioned conduit between the two fluid connections thereto for forming a significant drop in fluid pressure, whereby a differential fluid pressure is created in said chambers which modifies the influence of the valve member over the servomotor.

10. In a fluid pressure control system including a fluid pressure operated servomotor having a control piston responsive to fluid pressure acting on one side or the other side for moving the piston in opposite directions, a transfer control mechanism having a fluid pressure inlet and further having a pair of conduits arranged to deliver fluid under pressure to the opposite sides of the piston, a valve member in said transfer control mechanism having a limited movement in opposite directions along a prescribed path, said valve member being operable at a balanced intermediate position to cut off the flow of fluid from said inlet to both of said conduits, but operable when moved from said balanced position to cause delivery of fluid from said inlet to one or the other of said conduits depending on its direction of movement, means operatively associated with said valve member for moving the same in either direction, a pair of fluid pressure chambers arranged to act on said valve member in opposition to one another, each of said chambers having a fluid connection with one of said conduits in order to receive fluid under pressure therefrom, said fluid connections being spaced apart longitudinally of the fluid stream flowing in the conduit to which they are connected, means in said last mentioned conduit between the two fluid connections thereto forming a variable orifice in order to produce a difference in fluid pressure in said connections and said chambers associated therewith, and control means operatively coupled to said variable orifice means for varying the size of the orifice and the fluid pressure drop thereacross.

11. In a fluid pressure control system including a fluid pressure operated servomotor having a control piston responsive to fluid pressure acting on one side or the other side for moving the piston in opposite directions, a transfer control mechanism having a fluid pressure inlet and further having a pair of conduits arranged to deliver fluid under pressure to the opposite sides of the piston, a valve member in said transfer control mechanism having a limited movement in opposite directions along a prescribed path, said valve member being operable at a balanced intermediate position to cut off the flow of fluid from said inlet to both of said conduits, but operable when moved from said balanced position to cause delivery of fluid from said inlet to one or the other of said conduits depending on its direction of movement, means operatively associated with said valve member for moving the same in either direction, a pair of fluid pressure chambers arranged to act on said valve member in opposition to one another, each of said chambers having a fluid connection with one of said conduits in order to receive fluid under pressure therefrom, said fluid connections being spaced apart longitudinally of the fluid stream flowing in the conduit to which they are connected, means in said last mentioned conduit between the two fluid connections thereto forming a variable orifice which produces a difference in fluid pressure in said connections and said chambers associated therewith, a control element sensitive to fluid pressure changes and movable proportionally thereto, and an operative connection between the control element and said variable orifice means and automatically varying the size of the orifice in response to changes in fluid pressure sensed by the element.

12. A fluid pressure transfer valve mechanism comprising, in combination, a body having a fluid pressure inlet and a pair of fluid pressure outlets, separate conduits connected to said outlets for delivering fluid under pressure, a valve member in said body having a limited movement in opposite directions along a prescribed path, said valve member being operable at a balanced intermediate position to cut off the flow of fluid from said inlet to both of said conduits, but operable when moved from said balanced position to cause delivery of fluid from said inlet to one or the other of said conduits depending on its direction of movement, means operatively associated with said valve member for moving the same in either direction, a pair of fluid pressure chambers arranged to act on said valve member in opposition to one another, each of said chambers having a fluid connection with one of said conduits in order to receive fluid under pressure therefrom, said fluid connections being spaced apart longitudinally of the fluid stream flowing in the conduit to which they are connected, and means in the section of said last mentioned conduit between the two fluid connections thereto for forming a significant drop in fluid pressure, whereby a differential fluid pressure is created in said chambers which modifies the influence of the valve member over the servomotor.

CYRUS BECK.

References Cited in the file of this patent
UNITED STATES PATENTS

| Number | Name | Date |
|---|---|---|
| 1,772,403 | Smoot | Aug. 5, 1930 |
| 2,484,557 | Eckman | Oct. 11, 1949 |
| 2,540,193 | Eckman | Feb. 6, 1951 |